(12) United States Patent
Suciu et al.

(10) Patent No.: US 10,526,976 B2
(45) Date of Patent: *Jan. 7, 2020

(54) TANGENTIAL DRIVE FOR GAS TURBINE ENGINE ACCESSORIES

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: United Technologies Corporation, Farminton, CT (US)

( * ) Notice: Subject to any disclaimer, the term of this patent is extended or adjusted under 35 U.S.C. 154(b) by 257 days.

This patent is subject to a terminal disclaimer.

(21) Appl. No.: 15/498,764

(22) Filed: Apr. 27, 2017

(65) Prior Publication Data

US 2018/0313274 A1    Nov. 1, 2018

(51) Int. Cl.
*F02C 7/36* (2006.01)

(52) U.S. Cl.
CPC ...... *F02C 7/36* (2013.01); *F05D 2260/40311* (2013.01)

(58) Field of Classification Search
None
See application file for complete search history.

(56) References Cited

U.S. PATENT DOCUMENTS

| | | | |
|---|---|---|---|
| 2,638,744 A | | 5/1953 | Price |
| 4,912,921 A | * | 4/1990 | Rice .......................... F02C 7/32 244/58 |
| 7,882,691 B2 | | 2/2011 | Lemmers, Jr. et al. |
| 7,942,079 B2 | | 5/2011 | Russ |
| 9,416,734 B2 | | 8/2016 | Thies et al. |
| 9,500,133 B2 | | 11/2016 | Davis et al. |
| 10,196,930 B2 | * | 2/2019 | Suciu ....................... F01D 25/10 |
| 2011/0154827 A1 | | 6/2011 | Ress, Jr. et al. |
| 2012/0309582 A1 | * | 12/2012 | McCune ................. F02C 3/107 475/331 |

(Continued)

FOREIGN PATENT DOCUMENTS

EP    3032074 A1    6/2016

OTHER PUBLICATIONS

Partial European Search Report for EP Application No. 18169613.9 dated Jan. 2, 2019.

*Primary Examiner* — Michael Lebentritt
(74) *Attorney, Agent, or Firm* — Carlson, Gaskey & Olds, P.C.

(57) ABSTRACT

A gas turbine engine comprises a high speed spool and a low speed spool. A low speed power takeoff is driven by the low speed spool and a high speed power takeoff is driven by the high speed spool. The low speed power takeoff drives a plurality of low speed driven accessories about low speed spool drive axes and the high speed power takeoff drives a plurality of high speed driven accessories about high speed spool drive axes. The low speed spool drive axes are generally tangential to an envelope defined about a center axis of the engine, and the high speed spool drive axes are generally tangential to an envelope defined about the center.

18 Claims, 2 Drawing Sheets

(56) References Cited

U.S. PATENT DOCUMENTS

| | | | | |
|---|---|---|---|---|
| 2013/0035190 A1* | 2/2013 | McCune | ............... | F02C 7/32 |
| | | | | 475/159 |
| 2014/0133958 A1* | 5/2014 | McCune | ............... | F02C 7/36 |
| | | | | 415/1 |
| 2014/0150440 A1* | 6/2014 | Suciu | ............... | F02C 7/236 |
| | | | | 60/772 |
| 2015/0330300 A1* | 11/2015 | Suciu | ............... | F02C 7/27 |
| | | | | 416/169 R |
| 2016/0010561 A1 | 1/2016 | Cloft et al. | | |
| 2016/0032755 A1 | 2/2016 | Beutin et al. | | |
| 2016/0230843 A1* | 8/2016 | Duong | ............... | F02K 3/06 |
| 2016/0369706 A1* | 12/2016 | Suciu | ............... | F02K 3/115 |
| 2017/0210478 A1* | 7/2017 | Mackin | ............... | B64D 15/12 |
| 2017/0284220 A1* | 10/2017 | Roberge | ............... | F02C 9/00 |
| 2018/0283281 A1* | 10/2018 | Veilleux, Jr. | ............... | F02C 7/36 |
| 2018/0291817 A1* | 10/2018 | Suciu | ............... | F02C 7/32 |

\* cited by examiner

# TANGENTIAL DRIVE FOR GAS TURBINE ENGINE ACCESSORIES

BACKGROUND OF THE INVENTION

This application relates to a gas turbine engine wherein accessories are driven by both a low speed spool and a high speed spool and wherein the axes of rotation of the accessories are generally tangential to a circumferential envelope of the gas turbine engine.

Gas turbine engines are known and typically include a fan delivering air into a bypass duct as propulsion air and into a core engine. Air in the core engine is compressed and then delivered into a combustor where it is mixed with fuel and ignited. Products of this combustion pass downstream over turbine rotors driving them to rotate.

There are a number of accessories which are associated with the gas turbine engine and which are typically driven by takeoff power shafts driven to rotate by the turbine rotors. Among the accessories are electrical generators, pumps, etc.

In one style of gas turbine engine, there are at least two spools connecting the turbine to a compressor section and connecting a turbine section to a fan and/or compressor section. It has been proposed to drive accessories from power shafts driven with each of the spools.

SUMMARY OF THE INVENTION

In a featured embodiment, a gas turbine engine comprises a high speed spool and a low speed spool. A low speed power takeoff is driven by the low speed spool and a high speed power takeoff is driven by the high speed spool. The low speed power takeoff drives a plurality of low speed driven accessories about low speed spool drive axes and the high speed power takeoff drives a plurality of high speed driven accessories about high speed spool drive axes. The low speed spool drive axes are generally tangential to an envelope defined about a center axis of the engine, and the high speed spool drive axes are generally tangential to an envelope defined about the center axis.

In another embodiment according to the previous embodiment, the low speed spool drive axes are all within ten degrees of a tangential and the high speed spool drive axes are all within ten degrees of a tangential.

In another embodiment according to any of the previous embodiments, at least a plurality of the low speed spool drive axes and a plurality of the high speed spool drive axes are actually tangential to an envelope defined by the center axis of the engine.

In another embodiment according to any of the previous embodiments, the low speed spool drive axes are all spaced by a common distance from the center axis.

In another embodiment according to any of the previous embodiments, a low speed gearbox receives the low speed power take-off, and connects the low speed power take-off to drive the low speed driven accessories. A high speed gearbox receives the high speed power take-off to drive the high speed driven accessories.

In another embodiment according to any of the previous embodiments, the low speed gearbox and the high speed gearbox are one combined gearbox.

In another embodiment according to any of the previous embodiments, the combined gearbox has a curved inner surface which is curved about the center axis of the engine.

In another embodiment according to any of the previous embodiments, at least a plurality of the low speed spool drive axes and a plurality of the high speed spool drive axes are actually tangential to an envelope defined by the center axis of the engine.

In another embodiment according to any of the previous embodiments, the low speed spool drive axes are all spaced by a common distance from the center axis.

In another embodiment according to any of the previous embodiments, a low speed gearbox receives the low speed power take-off, and connects the low speed power take-off to drive the low speed driven accessories. A high speed gearbox receives the high speed power take-off to drive the high speed driven accessories.

In another embodiment according to any of the previous embodiments, the low speed gearbox and the high speed gearbox are one combined gearbox.

In another embodiment according to any of the previous embodiments, the low speed driven accessories are axially spaced relative to each other along the center axis.

In another embodiment according to any of the previous embodiments, a low speed gearbox receives the low speed power take-off, and connects the low speed power take-off to drive the low speed driven accessories. A high speed gearbox receives the high speed power take-off to drive the high speed driven accessories.

In another embodiment according to any of the previous embodiments, the low speed gearbox and the high speed gearbox are one combined gearbox.

In another embodiment according to any of the previous embodiments, the one combined gearbox has a curved inner surface which is curved about the center axis of the engine.

In another embodiment according to any of the previous embodiments, the high speed driven accessories are axially spaced relative to each other along the center axis.

In another embodiment according to any of the previous embodiments, the low speed driven accessories are axially spaced relative to each other along the center axis.

In another featured embodiment, a gas turbine engine comprises a high speed spool and a low speed spool. A low speed power takeoff is in rotatable relationship to the low speed spool and a high speed power takeoff is in rotatable relationship to the high speed spool. A plurality of low speed driven accessories is intermeshed with, and configured for rotation by the low speed power takeoff about low speed spool drive axe. A plurality of high speed driven accessories is intermeshed with, and configured for rotation by the high speed power takeoff about high speed spool drive axes. The low speed spool drive axes are generally tangential to an envelope defined about a center axis of the engine, and the high speed spool drive axes are generally tangential to an envelope defined about the center axis.

In another featured embodiment, a first tower shaft and a second tower shaft, comprise a gearbox housing, a plurality of first gears arranged within the gearbox housing and meshed together in a first plane. A plurality of second gears are arranged within the gearbox housing and meshed together in a second plane. The second plane is spaced from the first plane and the second plane is not parallel with the first plane. A first torque transmission device is configured to couple and transmit torque between the first tower shaft and one of the first gears. A second torque transmission device is configured to couple and transmit torque between the second tower shaft and one of the second gears.

In another embodiment according to the previous embodiment, the first plane is parallel with an axial centerline of the gas turbine engine.

These and other features may be best understood from the following drawings and specification.

DETAILED DESCRIPTION

Figures 1A, 1B:
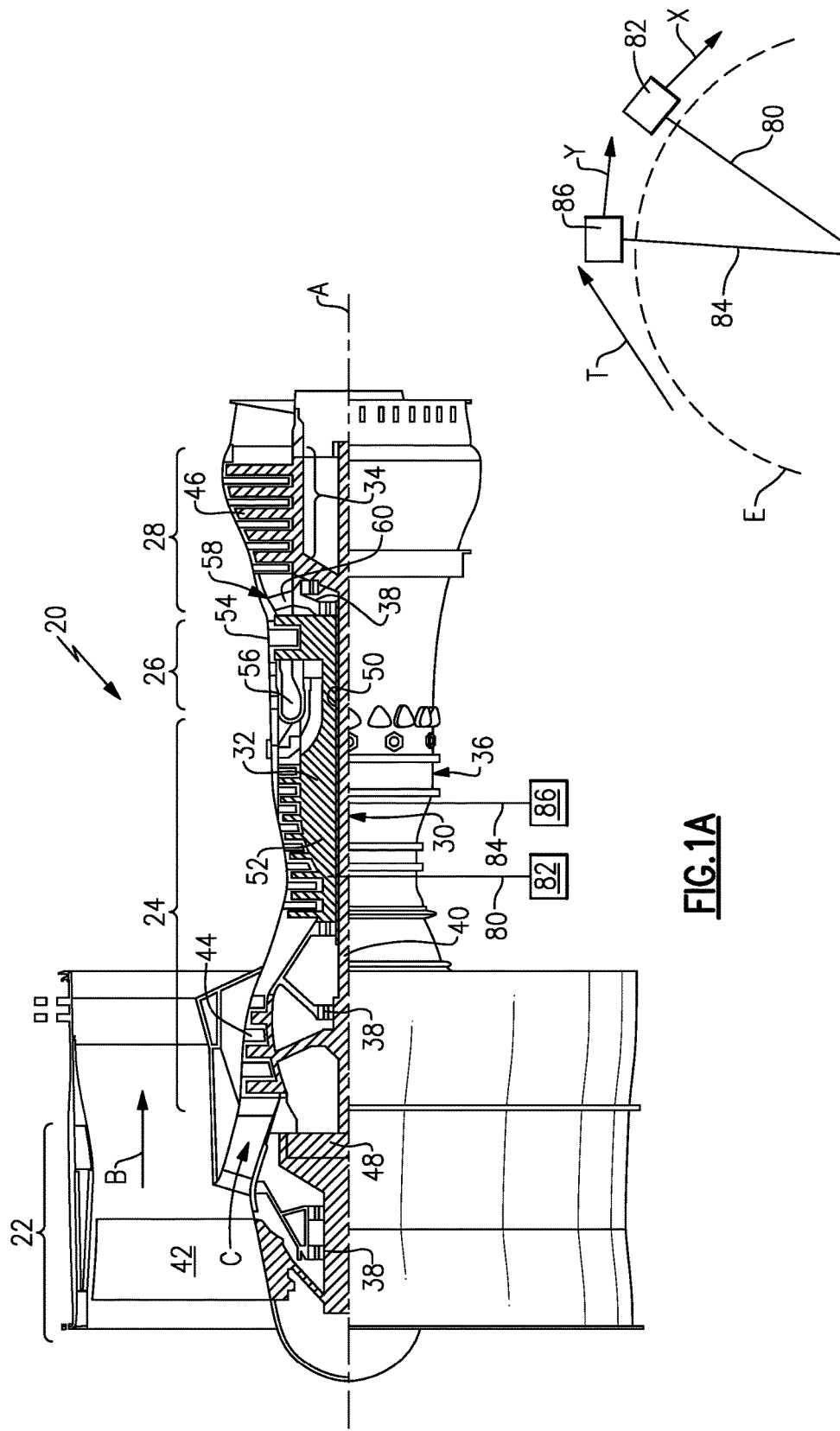
FIG. 1A schematically shows a gas turbine engine.
FIG. 1B shows details of an accessory drive as associated with this disclosure.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

A first power takeoff 80 is driven to rotate with the high speed spool 32 and drives an accessory drive arrangement 82. A second power takeoff shaft 84 rotates with the low speed spool 30 and drives an accessory drive arrangement 86.

As shown in FIG. 1B, the accessory drive arrangements 82 and 86 generally include drive axes x and y, respectively, for their respective auxiliary drive axes. A tangent T may be taken relative to a circumferential envelope E of the gas turbine engine defined about a center axis C. The drive axes x and y are typically close to, or generally tangential at the point where the accessory drive arrangements 82 and 86 are mounted. In one embodiment, the axes x and y are within 10 degrees of a tangential T at those locations. This angle may be taken as the definition for "generally" or "close" to "tangential" for this application. For purposes of this application, the term "generally tangential" means that the axis will be within that angle relative to a tangential.

With this arrangement, the necessity for providing a lay shaft to drive the accessories, as is required when the accessory drive axes are parallel to an axis of rotation of the engine, may be eliminated. Moreover, the accessories may now be housed in a much smaller envelope.

Figure 2:
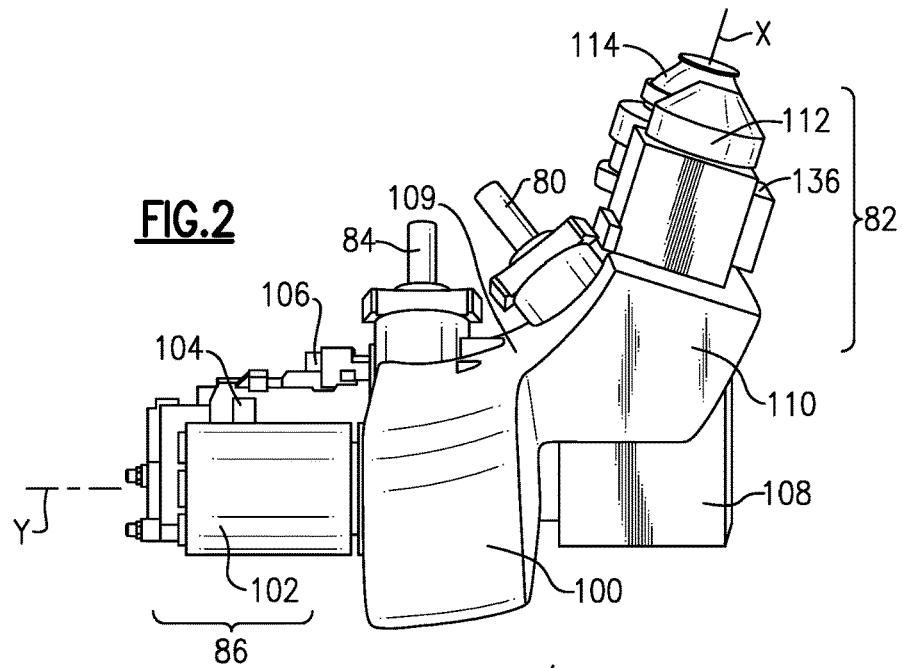
FIG. 2 shows one accessory drive arrangement.

FIG. 2 shows details of the accessory drive arrangements 82 and 86. Drive shaft 80 drives the accessory drive arrangement 82 while a drive shaft 84 drives the accessory drive arrangement 86. A gearbox 110 receives input from the shaft 84 and drives elements 102, 104, and 106. As can be appreciated from this figure, the elements 102, 104, and 106 have parallel drive axes which are spaced axially along the center axis of the engine. A combined gearbox 109 houses drive gears in portion 100 and portion 110 and is curved to fit at an inner periphery and about a center axis of the engine. The gearbox portion 110 drives accessories 112, 114 and 136 generally along axes x and spaced axially along the center axis of the engine. Another component 108 is driven to rotate by the shaft 84 and also rotates generally along an axis Y.

In one embodiment, component 102 may be a hydraulic pump, 104 a generator, 106 a main oil pump, 108 a transmission, 112 a fuel pump, 114 an air starter, and 136 a permanent magnet alternator.

Figure 3:
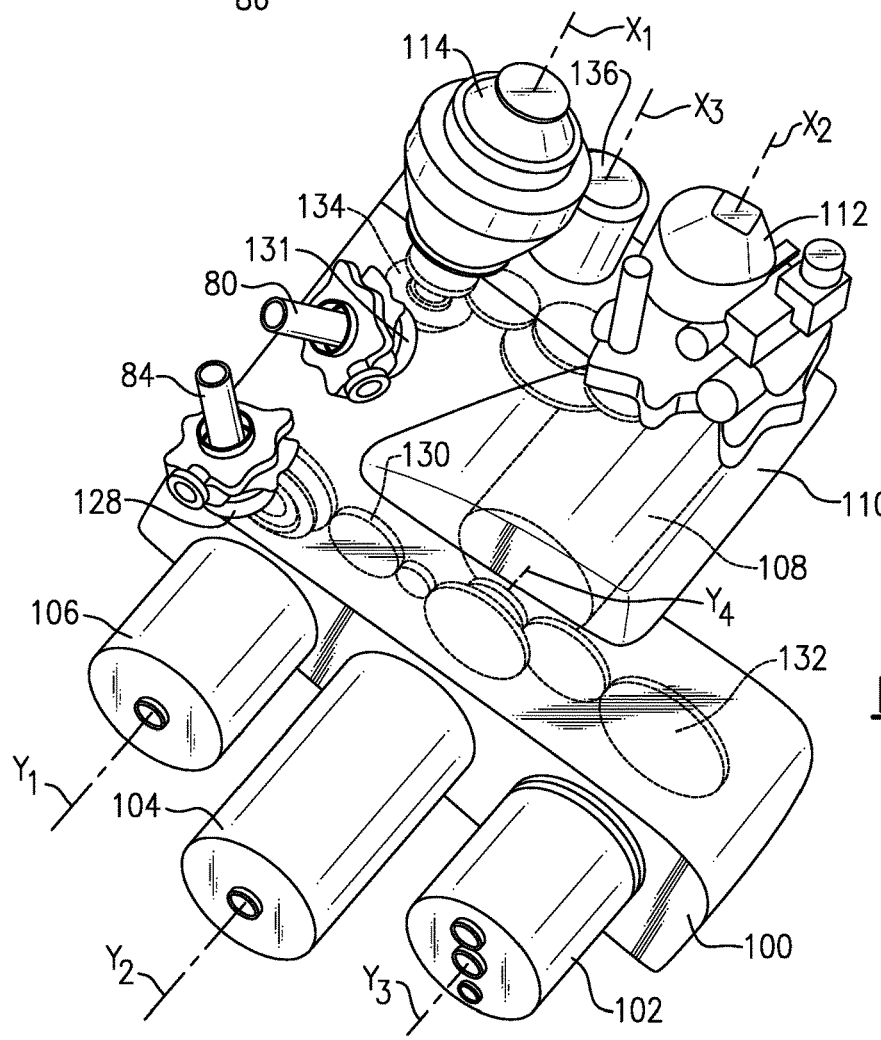
FIG. 3 is a view of the FIG. 2 structure.

FIG. 3 shows further details. A bevel gear 128 drives a plurality of gears 130 to, in turn, drive shafts associated with components 102, 104, 106, and 108. As can be appreciated, drive axes $Y_1$, $Y_2$, $Y_3$, and $Y_4$ are all generally parallel to each other. In one embodiment, they are at a common radial distance from the center point C although that may vary. In addition, as can be appreciated, they are spaced along an axial dimension of the engine.

Similarly, components 112, 114, and 136 rotate about drive axes $X_2$, $X_3$, and $X_1$, as shown. Bevel gear 131 drives a plurality of gears 134 to transmit rotation. Again, these axes need not be at a common radial distance from the center axis 102, but they are generally parallel to each other.

In an embodiment, all of the axes $Y_1$, $Y_2$, $Y_3$, $Y_4$, $X_1$, $X_2$, and $X_3$, are generally tangential, as defined. In further embodiments, the axes are actually tangential.

One embodiment could be summarized as a gas turbine engine having a high speed spool 32 and a low speed spool 30. A low speed power takeoff 84 is in rotatable relationship to the low speed spool and a high speed power takeoff in rotatable relationship to the high speed spool. A plurality of low speed driven accessories 102/104/106 are intermeshed with, and configured for rotation by the low speed power takeoff about low speed spool drive axes Y and a plurality of high speed driven accessories 112/114/136/108 are intermeshed with, and configured for rotation by the high speed power takeoff about high speed spool drive axes X. The low speed spool drive axes Y are generally tangential to an envelope E defined about a center axis of the engine, and the high speed spool drive axes X are generally tangential to an envelope defined about the center axis.

In another embodiment, an assembly for a gas turbine engine with a first tower shaft 80 includes a gearbox housing 110. A plurality of first gears 134 is arranged within the gearbox housing and meshed together in a first plane (perpendicular to drive axes $X_1$, $X_2$, and $X_3$. A plurality of second gears is arranged within the gearbox housing and meshed together in a second plane (perpendicular to drive axes $Y_1$, $Y_2$, and $Y_3$. The second plane is spaced from the first plane and the second plane is not parallel with the first plane. A first torque transmission device 134 is configured to couple and transmit torque between the first tower shaft and one of the first gears. A second torque transmission device 128 is configured to couple and transmit torque between the second tower shaft and one of the second gears 132.

The first plane is parallel with an axial centerline of the gas turbine engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a high speed spool and a low speed spool; and
a low speed power takeoff to be driven by said low speed spool and a high speed power takeoff to be driven by said high speed spool, said low speed power takeoff for driving a plurality of low speed driven accessories about low speed spool drive axes and said high speed power takeoff for driving a plurality of high speed driven accessories about high speed spool drive axes, and said low speed spool drive axes being generally tangential to an envelope defined about a center axis of said engine, and said high speed spool drive axes being generally tangential to an envelope defined about said center axis; and
a plurality of first gears meshed to be driven by said low speed spool in a first plane, and drive said plurality of low speed driven accessories, and a plurality of second gears meshed to be driven by said high speed spool in a second plane, and drive said plurality of high speed driven accessories, said second plane being spaced from said first plane, and said second plane is non-parallel with said first plane.

2. The gas turbine engine as set forth in claim 1, wherein said low speed spool drive axes are all within ten degrees of a tangential and said high speed spool drive axes are all within ten degrees of a tangential.

3. The gas turbine engine as set forth in claim 2, wherein at least a plurality of said low speed spool drive axes and a plurality of said high speed spool drive axes are actually tangential to an envelope defined by the center axis of said engine.

4. The gas turbine engine as set forth in claim 2, wherein said low speed spool drive axes are all spaced by a common distance from said center axis.

5. The gas turbine engine as set forth in claim 4, wherein a low speed gearbox receives said low speed power take-off, and connects said low speed power take-off to drive said low speed driven accessories, and there being a high speed gearbox receiving said high speed power take-off to drive said high speed driven accessories.

6. The gas turbine engine as set forth in claim 5, wherein said low speed gearbox and said high speed gearbox are one combined gearbox.

7. The gas turbine engine as set forth in claim 6 wherein said combined gearbox has a curved inner surface which is curved about said center axis of said engine.

8. The gas turbine engine as set forth in claim 1, wherein at least a plurality of said low speed spool drive axes and a plurality of said high speed spool drive axes are actually tangential to an envelope defined by the center axis of said engine.

9. The gas turbine engine as set forth in claim 8, wherein said low speed spool drive axes are all spaced by a common distance from said center axis.

10. The gas turbine engine as set forth in claim 9, wherein a low speed gearbox receives said low speed power take-off, and connects said low speed power take-off to drive said low speed driven accessories, and there being a high speed gearbox receiving said high speed power take-off to drive said high speed driven accessories.

11. The gas turbine engine as set forth in claim 2, wherein said low speed gearbox and said high speed gearbox are one combined gearbox.

12. The gas turbine engine as set forth in claim 2, wherein said low speed driven accessories are axially spaced relative to each other along said center axis.

13. The gas turbine engine as set forth in claim 1, wherein a low speed gearbox receives said low speed power take-off, and connects said low speed power take-off to drive said low speed driven accessories, and there being a high speed gearbox receiving said high speed power take-off to drive said high speed driven accessories.

14. The gas turbine engine as set forth in claim 13, wherein said low speed gearbox and said high speed gearbox are one combined gearbox.

15. The gas turbine engine as set forth in claim 14, wherein said one combined gearbox has a curved inner surface which is curved about said center axis of said engine.

16. The gas turbine engine as set forth in claim 1, wherein said high speed driven accessories are axially spaced relative to each other along said center axis.

17. The gas turbine engine as set forth in claim 1, wherein said low speed driven accessories are axially spaced relative to each other along said center axis.

18. An assembly for a gas turbine engine with a first tower shaft and a second tower shaft, the assembly comprising:
   a gearbox housing;
   a plurality of first gears arranged within the gearbox housing and meshed together in a first plane;
   a plurality of second gears arranged within the gearbox housing and meshed together in a second plane, wherein the second plane is spaced from the first plane and the second plane is not parallel with the first plane;
   a first torque transmission device configured to couple and transmit torque between the first tower shaft and one of the first gears;
   a second torque transmission device configured to couple and transmit torque between the second tower shaft and one of the second gears; and
   wherein the first plane is parallel with an axial centerline of the gas turbine engine.

* * * * *